H. L. SMITH.
POINTING TOOL.
APPLICATION FILED MAR. 17, 1914.
1,108,407.
Patented Aug. 25, 1914.
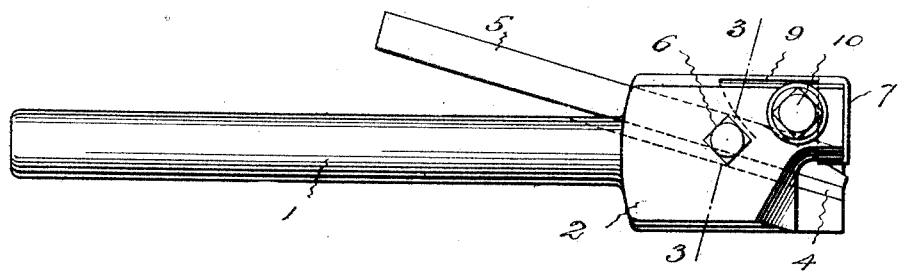
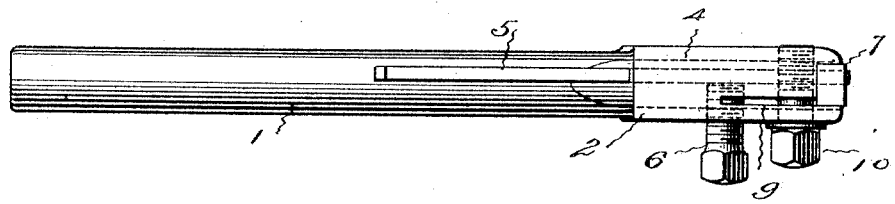
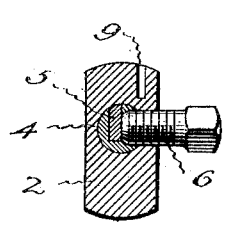 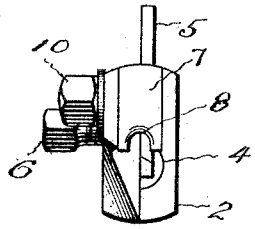
Witnesses:
Adolph C. Kaiser
Josephine M. Strempfer
Inventor:
Henry L. Smith
by Harry P. Williams
Atty.

UNITED STATES PATENT OFFICE.

HENRY L. SMITH, OF WATERBURY, CONNECTICUT, ASSIGNOR TO THE E. J. MANVILLE MACHINE COMPANY, OF WATERBURY, CONNECTICUT, A CORPORATION OF CONNECTICUT.

POINTING-TOOL.

1,108,407.

Specification of Letters Patent.    Patented Aug. 25, 1914.

Application filed March 17, 1914.   Serial No. 825,225.

*To all whom it may concern:*

Be it known that I, HENRY L. SMITH, a citizen of the United States, residing at Waterbury, in the county of New Haven and State of Connecticut, have invented a new and useful Improvement in Pointing-Tools, of which the following is a specification.

This invention relates to a tool which is designed to be used in a wood screw pointing and threading machine for tapering or beveling the point ends of the screw blanks.

The object of the invention is to provide a pointing tool for a wood screw pointing and threading machine, having a holder which is simple and cheap in construction and which will firmly hold a tool blade of considerable length in such manner that an efficient cut can be produced and yet allow the blade to be easily removed, sharpened and re-adjusted so that it will have a long life.

Figure 1 of the accompanying drawings shows a side view of a tool which embodies this invention. Fig. 2 shows an edge view of the same. Fig. 3 is a transverse section on the plane indicated by the dotted line 3—3 on Fig. 1. Fig. 4 is a view looking at the front end.

At the front end of the shank 1 which is designed to be clamped in the machine, is a head 2. In making this tool a round hole is drilled from the upper side at the back end of the head diagonally downward to the front end of the head, and driven tightly into this hole is a cylindrical plug 4 which has a longitudinal groove along one side. The groove which is made in this plug before it is driven in place is shaped to receive the cutting blade 5, which is a rectangular bar of steel with its front end ground to cut the point on the blank which is fed to it. The blade when located in proper position is clamped in place by setting up against it the set screw 6, which turns in a threaded hole in the side of the head and cylindrical plug driven therein.

In a mortise made vertically in the front end of the head is a centering block 7 which has a notch 8 in its lower edge that centers the blanks and backs them up while the points are being cut by the tool blade. In order that the centering and backing block may be clamped in place one wall of the mortise containing the block is made yielding by cutting a vertical groove 9 in the front end of the head on one side so that when the clamp screw 10 is turned up the block will be clamped in place in the mortise.

When the set screw 6 is loosened the cutting blade may be adjusted, or removed for sharpening, or another blade may be substituted as desired, and when the clamp screw 10 is loosened the centering and backing block 7 may be adjusted or another substituted which will correspond with the blank to be pointed. It is a simple matter to drill a round hole obliquely through the head in the manner described, and it is easy to cut a groove in the cylindrical plug that will exactly fit the blade, before the plug is inserted in the head. The plug when inserted is driven tightly in place so that it will hold by its own friction, and it is also held by the set screw which turns through the head and through the plug against the side of the blade. With the blade holding groove arranged in the manner shown, a long blade may be used and this blade can of course be repeatedly sharpened so that it may be used a long time.

The invention claimed is:

1. A tool for a screw machine having a supporting shank, a head at one end of the shank, said head having a transverse mortise in the front end and a blade opening obliquely through it from the front end to the back end, a blade extending obliquely to the axis of the head through the opening therein, means for clamping the blade in place, a centering and backing block in the transverse mortise in the front end of the head and opposite the cutting end of the blade, and means for clamping the said block in place.

2. A tool for a screw machine having a supporting shank, a head with an oblique hole at one end of the shank, a grooved plug set in the hole obliquely through the head, a blade fitting the groove in said plug, and means for clamping the blade in said groove.

3. A tool for a screw machine having a supporting shank, a head with an oblique hole at one end of the shank, a grooved plug driven into the hole obliquely through the head, a blade fitting the groove in said plug, a screw for holding the blade in said groove, a backing block movable axially in the front end of the head opposite the cutting end of the blade, and a screw for clamping the backing block in place.

HENRY L. SMITH.

Witnesses:
CHARLES E. HART, Jr.,
ALICE V. MILLER.